United States Patent
Zhao et al.

(10) Patent No.: US 12,439,378 B2
(45) Date of Patent: Oct. 7, 2025

(54) METHOD FOR DETERMINING SIDELINK TRANSMISSION RESOURCE, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 455 days.

(21) Appl. No.: 17/563,728

(22) Filed: Dec. 28, 2021

(65) Prior Publication Data
US 2022/0124683 A1   Apr. 21, 2022

Related U.S. Application Data

(63) Continuation of application No. PCT/CN2019/109284, filed on Sep. 30, 2019.

(51) Int. Cl.
*H04W 72/02* (2009.01)
*H04L 5/00* (2006.01)
(Continued)

(52) U.S. Cl.
CPC ........... *H04W 72/02* (2013.01); *H04L 5/0051* (2013.01); *H04W 72/0446* (2013.01);
(Continued)

(58) Field of Classification Search
CPC ............. H04W 72/02; H04W 72/0446; H04W 72/0453; H04W 72/20; H04W 72/56;
(Continued)

(56) References Cited

U.S. PATENT DOCUMENTS

| | | |
|---|---|---|
| 10,212,699 B2 | 2/2019 | Kim et al. |
| 2018/0103441 A1 | 4/2018 | Lim et al. |

(Continued)

FOREIGN PATENT DOCUMENTS

| | | |
|---|---|---|
| CN | 108632780 A | 10/2018 |
| RU | 2698322 C1 | 8/2019 |

(Continued)

OTHER PUBLICATIONS

Huawei, HiSilicon, Sidelink physical layer structure for NR V2X, Aug. 30, 2019, 3GPP TSG RAN WG1 Meeting #98, R1-1908039, Internet <URL:https://www.3gpp.prg/ftp/tsg_ran/WG1_RL/TSGR1_98/DOcs/R1-1908039.zip>, pp. 1-4, 11-14. (Year: 2019).*

(Continued)

*Primary Examiner* — Chirag G Shah
*Assistant Examiner* — Joshua Smith
(74) *Attorney, Agent, or Firm* — Young Basile Hanlon & MacFarlane, P.C.

(57) ABSTRACT

A method for determining a sidelink transmission resource, a terminal device, and a network device are provided. The method includes determining a third transmission resource that includes a transmission resource for transmitting a physical sidelink shared channel (PSSCH), and determining a second transmission resource in the third transmission resource. The second transmission resource includes a time-domain resource the same as and/or adjacent to a time-domain resource for a demodulation reference signal (DMRS) of the PSSCH. The second transmission resource is used for transmitting second sidelink control information (SCI). The third transmission resource further includes a first transmission resource for transmitting first SCI.

16 Claims, 8 Drawing Sheets

(51) Int. Cl.
*H04W 72/0446* (2023.01)
*H04W 72/0453* (2023.01)
*H04W 72/20* (2023.01)
*H04W 72/56* (2023.01)

(52) U.S. Cl.
CPC ....... *H04W 72/0453* (2013.01); *H04W 72/20* (2023.01); *H04W 72/56* (2023.01)

(58) Field of Classification Search
CPC ....... H04W 4/40; H04W 72/21; H04W 76/14; H04W 92/18; H04L 5/0051; H04L 25/03866; H04L 5/0044; H04L 5/0053
See application file for complete search history.

(56) References Cited

U.S. PATENT DOCUMENTS

| | | | |
|---|---|---|---|
| 2019/0230633 A1 | 7/2019 | Chae et al. | |
| 2019/0239203 A1 | 8/2019 | Chae | |
| 2019/0306923 A1* | 10/2019 | Xiong | H04W 72/23 |
| 2020/0037343 A1* | 1/2020 | He | H04W 72/20 |
| 2021/0127361 A1* | 4/2021 | Yasukawa | H04W 72/02 |
| 2021/0288700 A1* | 9/2021 | Liu | H04W 72/04 |
| 2021/0352597 A1* | 11/2021 | Do | H04L 5/0053 |
| 2022/0078778 A1* | 3/2022 | Zhao | H04W 72/20 |
| 2022/0150023 A1* | 5/2022 | Yoshioka | H04L 5/0051 |
| 2022/0173828 A1* | 6/2022 | Yoshioka | H04W 72/02 |

FOREIGN PATENT DOCUMENTS

| | | |
|---|---|---|
| WO | 2016107244 A1 | 7/2016 |
| WO | 2020064214 A1 | 4/2020 |

OTHER PUBLICATIONS

Russian Office Action with English Translation for RU Application 2021139757 mailed Oct. 11, 2022. (19 pages).
Extended European Search Report for EP Application 19948108.6 mailed May 18, 2022. (10 pages).
Indian Examination Report for IN Application 202117061463 mailed Jul. 11, 2022. (7 pages).
CMCC, Discussion on HARQ feedback for NR V2X, 3GPP TSG RAN WGI #98, R1-1908864, Aug. 26-30, 2019. (6 pages).
Japanese Notice of Reasons for Refusal with English Translation for JP Application 2021578122 mailed Jun. 23, 2023. (8 pages).
3GPP TSG RAN WG1 Meeting #95 Spokane, USA, R1-1813095, ETRI, Discussion on NR V2X Sidelink Design, Nov. 12-16, 2018, 6 pages.
3GPP TSG RAN WG1 Meeting #96 Athens, Greece, R1-1901482, MCC Support, Final Report of 3GPP TSG RAN WG1 #95 v1.0.0 (Spokane, USA, Nov. 12-16, 2018), Feb. 25-Mar. 1, 2019, 172 pages.
3GPP TSG RAN WG1 Meeting #98 Prague, Czech Republic, R1-1908039, Huawei, HiSilicon, Sidelink physical layer structure for NR V2X, Aug. 26-30, 2019, 32 pages.
3GPP TSG RAN WG1 #98 Prague, Czech, R1-1908396, MediaTek Inc., Discussion on sidelink physical layer structure, Aug. 26-30, 2019, 19 pages.
3GPP TSG RAN WG1 Meeting #98 Prague, Czech Republic, R1-1908633, Intel Corporation, Physical Structure for NR V2X, Aug. 26-30, 2019, 24 pages.
3GPP TSG RAN WG1 #98 Prague, CZ, R1-1908900, LG Electronics, Discussion on physical layer structure for NR sidelink, Aug. 26-30, 2019, 34 pages.
3GPP TSG-RAN WG1 Meeting #98 Prague, CZ, R1-1908911, Ericsson, PHY layer structure for NR sidelink, Aug. 26-30, 2019, 20 pages.
3GPP TSG RAN WG1 Meeting #98 Prague, CZ, R1-1909252, Qualcomm Incorporated, Considerations on Physical Layer aspects of NR V2X, Aug. 26-30, 2019, 17 pages.
International Search Report with English Translation for PCT Application PCT/CN2019/109284 mailed Jun. 29, 2020. (11 pages).
Chinese First Office Action with English Translation for CN Application 202210084576.5 mailed Feb. 21, 2023. (18 pages).
Extended European Search Report issued in corresponding EP application No. 24203013.8 dated Oct. 25, 2024, 10 pages.
Israeli Examination Report issued in corresponding IL Application No. 289429, dated Jan. 29, 2024, 5 pages.
Korean Request for the Submission of an Opinion with English translation, issued in corresponding KR Application No. 10-2021-7043148, dated Jan. 23, 2025, 11 pages.
Japanese Notice of Reasons for Refusal with English translation, issued in corresponding JP Application No. 2023-193943, dated Feb. 7, 2025, 6 pages.
Notice of Reasons for Refusal and English Translation issued in corresponding JP application No. 2023-193943 dated Jun. 3, 2025. 6 pages.
Examinatiuon Report issued in corresponding AU application No. 2019468770 dated Aug. 4, 2025. 4 pages.

* cited by examiner

METHOD FOR DETERMINING SIDELINK TRANSMISSION RESOURCE, TERMINAL DEVICE, AND NETWORK DEVICE

CROSS-REFERENCE TO RELATED APPLICATION(S)

This application is a continuation of International Application No. PCT/CN2019/109284, filed on Sep. 30, 2019, the disclosure of which is hereby incorporated by reference in its entirety.

TECHNICAL FIELD

This disclosure relates to the communication field, and in particular to a method and an apparatus for determining a sidelink transmission resource.

BACKGROUND

The fifth generation (5th generation, 5G) communication system supports vehicle to everything (V2X) communication. The V2X communication is a sidelink transmission technology, where a terminal device can communicate directly with another terminal device without forwarding of a network device, thus having a relatively high spectrum efficiency and a relatively low transmission latency.

In the V2X communication, a transmitter of a sidelink may use a transmission resource for a data channel to transmit a control channel. For example, the transmitter of the sidelink may use a transmission resource for a physical sidelink shared channel (PSSCH) to transmit a physical sidelink control channel (PSCCH). The aforementioned PSCCH may be a second-order PSCCH, that is, the aforementioned PSCCH may include a first PSCCH and a second PSCCH. The first PSCCH may carry information for a receiver of the sidelink to perform sensing, and the second PSCCH may carry information for demodulating the PSSCH.

The first PSCCH may also include information indicating a transmission resource for the second PSCCH, so as to reduce complexity of detecting the second PSCCH by the receiver of the sidelink. The receiver of the sidelink may receive the first PSCCH through blind detection, but there is no relevant conclusion on how to configure the transmission resource for the second PSCCH.

SUMMARY

In a first aspect, a method for determining a sidelink transmission resource is provided. The method includes the following. A third transmission resource is determined, where the third transmission resource includes a transmission resource for transmitting a physic sidelink shared channel (PSSCH). A second transmission resource is determined in the third transmission resource. The second transmission resource includes a time-domain resource the same as and/or adjacent to a time-domain resource for a demodulation reference signal (DMRS) of the PSSCH. The second transmission resource is used for transmitting second sidelink control information (SCI). The third transmission resource further includes a first transmission resource for transmitting first SCI.

In a second aspect, a terminal device is provided. The terminal device includes a processor and a memory storing a computer program which, when executed by the processor, cause the processor to determine a third transmission resource, where the third transmission resource includes a transmission resource for transmitting a PSSCH; and determine a second transmission resource in the third transmission resource, where the second transmission resource includes a time-domain resource the same as and/or adjacent to a time-domain resource for a DMRS of the PSSCH, the second transmission resource is used for transmitting second SCI, and the third transmission resource further includes a first transmission resource for transmitting first SCI.

In a third aspect, a network device is provided. The network device includes a processor and a memory storing a computer program which, when executed by the processor, cause the processor to determine a third transmission resource, where the third transmission resource includes a transmission resource for transmitting a PSSCH; and determine a second transmission resource in the third transmission resource, where the second transmission resource includes a time-domain resource the same as and/or adjacent to a time-domain resource for a DMRS of the PSSCH, the second transmission resource is used for transmitting second SCI, and the third transmission resource further includes a first transmission resource for transmitting first SCI.

DETAILED DESCRIPTION

The technical solutions in implementations of the present disclosure will be described below in conjunction with the drawings in the implementations of the present disclosure. Obviously, the described implementations are a part of rather than all the implementations. Based on the implementations of the present disclosure, all other implementations obtained by those of ordinary skill in the art without creative effort shall fall within the protection scope of the present disclosure.

Figure 1:
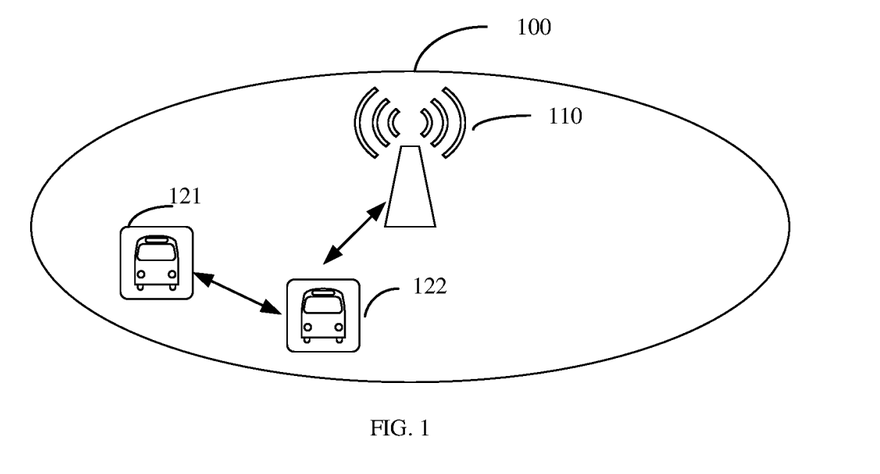
FIG. 1 is a schematic diagram illustrating a communication system applicable to the disclosure.

FIG. 1 is a schematic diagram illustrating a communication system 100 applicable to the disclosure.

The system 100 includes a network device 110, a terminal device 121, and a terminal device 122. The terminal device 121 and the terminal device 122 may be vehicles with communication functions, or in-vehicle electronic systems, mobile phones, wearable electronic devices, or other communication devices that implement a V2X protocol.

The network device 110 may be an evolved node B (eNB) in a long term evolution (LTE) system, or a 5G node B (gNB) in a 5G communication system. The above-mentioned network devices are only examples. The network device 110 may also be a relay station, an access point, an in-vehicle device, a wearable device, and other types of devices.

Before transmitting data through a sidelink, the terminal device 121 and the terminal device 122 may determine a sidelink transmission resource via an indication from the network device 110. The terminal device 121 and the terminal device 122 may also not use the indication from the network device 110 to determine the sidelink transmission resource.

The above two examples illustrate two transmission modes of sidelink communication, i.e., a centralized scheduling transmission mode (also referred to as mode 1) and a distributed transmission mode (also referred to as mode 2). The two transmission modes will be briefly introduced below.

Centralized scheduling transmission mode: in this mode, the terminal device transmits V2X data according to a resource allocated by the network device. Since the resource used by the terminal device is allocated by the network device, adjacent terminal devices will not be allocated the same resource, so that the centralized scheduling transmission mode has a relatively high transmission reliability. However, since signaling exchange may be required between the terminal device and the network device, compared with the distributed transmission mode, a transmission latency for transmitting data via the centralized scheduling transmission mode is longer.

Distributed transmission mode: in a scenario with network coverage, the network device may configure a resource pool for the terminal device via a system information block (SIB) or radio resource control (RRC) signaling. The terminal device may independently obtain some resources from the resource pool through random selection, based on a sensing reservation scheme, or based on a partial sensing reservation scheme to transmit V2X data. In a scenario without network coverage, the terminal device may independently obtain some resources from a resource pool configured by pre-configuration information to transmit data. The pre-configuration information may be information configured in the terminal device before the terminal device leaves the factory, or information pre-configured by the network device and stored in the terminal device. Since terminal devices may independently select resources, different terminal devices may select the same resource to transmit data. Therefore, compared with the centralized scheduling transmission mode, the reliability of using the distributed transmission mode to transmit data is lower.

In the distributed transmission mode, on condition that the terminal device selects some transmission resources from a resource pool for data transmission, for periodic transmission traffic, the terminal device may reserve a transmission resource for next transmission to prevent other users from preempting the transmission resource, and for aperiodic transmission traffic, the terminal device does not reserve a transmission resource.

The communication system 100 is only an example, and the communication system applicable to the present disclosure is not limited thereto.

Figure 2:
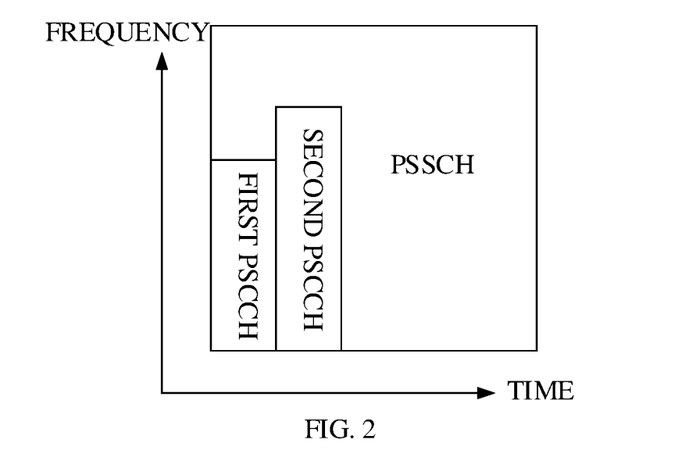
FIG. 2 is a schematic diagram illustrating a method for mapping a data channel and a control channel according to implementations of the disclosure.

In V2X communication, in order to reduce latency, a control channel and a data channel are mapped on transmission resources in a mapping manner as illustrated in FIG. 2. The control channel only occupies a few time-domain symbols, so a receiver can decode the control channel after reception of the control channel on the time-domain symbols, instead of waiting for reception of data in a complete time slot before decoding the control channel, thus reducing the latency.

In FIG. 2, the control channel is a second-order PSCCH, that is, the control channel includes a first PSCCH and a second PSCCH. The first PSCCH carries information for resource sensing and information for determining a second transmission resource (that is, the transmission resource occupied by the second PSCCH). For example, the information for resource sensing is indicated via a first information field of a first sidelink control information (SCI) carried in the first PSCCH. The information for determining the second transmission resource is indicated via a second information field of the first SCI carried in the first PSCCH. The second PSCCH carries information for demodulating the PSSCH. In FIG. 2, time-frequency positions of the first PSCCH and the second PSCCH are illustrated as an example, which may not be understood as a limitation on the time-frequency positions of the first PSCCH and the second PSCCH.

The above-mentioned information for resource sensing may include at least one of: information of a transmission resource for the PSSCH, priority information of traffic carried in the PSSCH, and indication information of reserved transmission resource.

The above-mentioned information for demodulating the PSSCH may include at least one of: modulation and coding scheme (MCS), the number of transmission layers, a process number of hybrid automatic repeat request (HARM), a new data indication (NDI), an identifier (ID) of a terminal device transmitting the PSSCH, and a destination ID.

The destination ID may include at least one of: a device identifier of the receiver (a terminal device receiving the PSCCH), a group identifier of the receiver, and a traffic identifier of the traffic carried in the PSSCH.

In case of unicast, the destination ID may be the device identifier of the receiver. In case of multicast, the destination ID may be the group identifier of the receiver, that is, an identifier of a device group to which the receiver belongs. In case of broadcast, the destination ID may be a traffic identifier, and only a terminal device which is interested in the traffic corresponding to the traffic identifier or a terminal device which can receive the traffic will receive the PSSCH.

The receiver can detect the first PSCCH, and determine the transmission resource for the second PSCCH according to the information in the first PSCCH. Therefore, the receiver does not blindly detect the second PSCCH. In order to reduce the complexity of blindly detecting the first PSCCH by the receiver, a transmission resource for the first PSCCH is usually pre-configured. For example, a resource pool for the first PSCCH is configured via pre-configuration or network configuration. In the resource pool, a position and a size of each candidate transmission resource are known. Therefore, the receiver can perform blind detection on each candidate transmission resource, and determine whether the first PSCCH exists according to the detection result.

Implementations of the disclosure provide a method and an apparatus for determining a sidelink transmission resource, which can effectively configure the transmission resource for the second PSCCH.

In the following, a method for determining a transmission resource for a second PSCCH will be described according to implementations of the present disclosure. A method 300 illustrated in FIG. 3 may be performed by a transmitter of a sidelink, or may be performed by a receiver of the sidelink, or may be performed by a network device.

Figure 3:
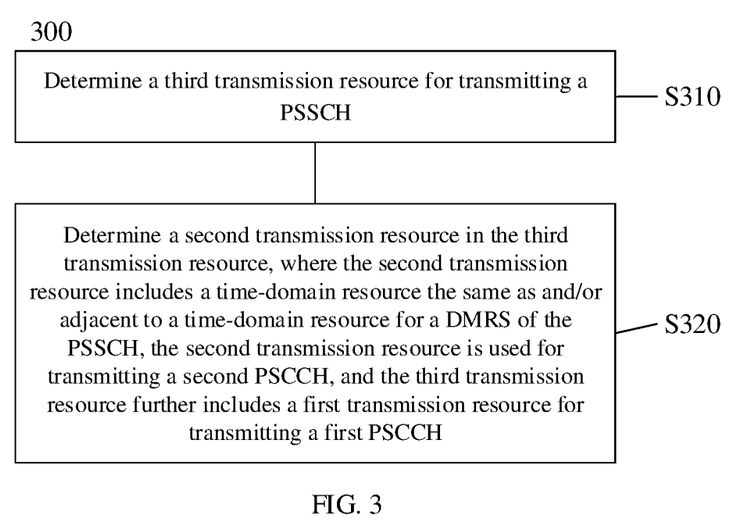
FIG. 3 is a schematic diagram illustrating a method for determining a sidelink transmission resource according to implementations of the disclosure.

As illustrated in FIG. 3, the method 300 includes the following.

At block S310, a third transmission resource for transmitting a PSSCH is determined.

The third transmission resource includes a transmission resource for the PSSCH, as illustrated in rectangles containing the PSSCH, a first PSCCH, and a second PSCCH. In case that the method 300 is executed by a terminal device (transmitter), the third transmission resource may be determined according to configuration information received from the network device, or may be independently selected by the terminal device. In case that the method 300 is executed by a terminal device (receiver), the third transmission resource is determined according to information carried in the first PSCCH.

In all the implementations of the present disclosure, transmitting a channel means transmitting information carried in the channel, and receiving a channel means receiving information carried in the channel. For example, the third transmission resource is used to transmit the PSSCH, meaning that the third transmission resource is used to transmit information carried in the PSSCH.

At block S320, a second transmission resource is determined in the third transmission resource. The second transmission resource includes a time-domain resource the same as and/or adjacent to a time-domain resource for a demodulation reference signal (DMRS) of the PSSCH (hereinafter, PSSCH DMRS). The second transmission resource is used for transmitting the second PSCCH. The third transmission resource further includes a first transmission resource for transmitting the first PSCCH.

The terminal device determines the second transmission resource in the third transmission resource as follows. The terminal device determines a size and a time-frequency position of the second transmission resource.

In some implementations, the size of the second transmission resource may be determined as follows.

The terminal device may determine the size of the second transmission resource according to information for determining the second transmission resource carried in the first PSCCH.

The above-mentioned information for determining the second transmission resource may include at least one of: a format of the second PSCCH, the number of information bits of a second SCI carried in the second PSCCH, the number of bits of the second SCI after subject to coding, a format of the second SCI carried in the second PSCCH, an aggregation level for the second PSCCH, a modulation scheme for the second SCI carried in the second PSCCH, a coding rate for the second SCI carried in the second PSCCH, and a size of frequency-domain resources occupied by the second PSCCH, and the number of time-domain symbols occupied by the second PSCCH.

In one implementation, the first SCI carried in the first PSCCH includes a second information field indicative of the format of the second SCI. At least one of the following information may be determined according to the format of the second SCI:

The number of the information bits of the second SCI refers to the total number of bits of respective information fields in the second SCI. In one example, the information bits of the second SCI include a cyclic redundancy check (CRC) bit.

The number of the bits of the second SCI after subject to the coding refers to the number of the bits after the information bits of the second SCI are subject to channel coding. For example, the channel coding refers to coding using a low density parity check (LDPC) code or a polar code.

The size of the second transmission resource may be determined according to the format of the second SCI. For example, the number of the bits of the second SCI after subject to the coding may be determined according to the format of the second SCI, and combined with the modulation scheme for the second PSCCH, the number of symbols of the second SCI after modulation may be determined, thereby determining the size of the second transmission resource. For another example, the number of the information bits of the second SCI may be determined according to the format of the second SCI, and combined with the modulation scheme and the coding rate for the second PSCCH, the number of the symbols of the second SCI after modulation may be determined, thereby determining the size of the second transmission resource.

In another implementation, the second information field indicates the aggregation level for the second PSCCH. The aggregation level indicates the number of control channel elements (CCEs). The size of the transmission resource for the second PSCCH can be determined according to the aggregation level for the second PSCCH.

In another implementation, the second information field carries index information of the second transmission resource in a resource set. The resource set is preset or pre-configured. The terminal device may determine, according to the index information, a resource size corresponding to the index information from a table, that is, the size of the second transmission resource is determined according to the index information and the table.

In another implementation, the second information field indicates the size of a frequency-domain resource occupied by the second PSCCH and/or the number of time-domain symbols occupied by the second PSCCH. The terminal device may determine the size of the second transmission resource according to the second information field.

A same MCS may be used for the second PSCCH and the PSSCH. A fixed modulation scheme such as quadrature phase shift keying (QPSK) modulation may be used for the second PSCCH. If different MCSs are used for the second PSCCH and the PSSCH, a modulation scheme and/or coding rate used for the second PSCCH may be indicated in the first PSCCH.

In an implementation, a coding rate for the second PSCCH may be the same as or different from that for the PSSCH. For example, the coding rate for the second PSCCH may be lower than that for the PSSCH, thereby improving performance of detecting the second PSCCH. In one example, the coding rate for the second PSCCH can be reduced by increasing the transmission resource for the second PSCCH.

For example, the terminal device may adjust a second-transmission-resource initial size based on a first parameter to determine a second-transmission-resource final size. In this case, the size of the second transmission resource determined by the information carried in the first PSCCH and used for determining the second transmission resource is the second-transmission-resource initial size.

The first parameter can be interpreted as a ratio of the second-transmission-resource initial size to the second-transmission-resource final size.

The terminal device (the transmitter or the receiver) may obtain the first parameter, and determine the second-transmission-resource final size according to the first parameter and the second-transmission-resource initial size. The above-mentioned first parameter may be configured by a higher layer, or may be configured by a network device, or may be pre-configured. For the receiver, the first parameter may also be obtained through the first PSCCH.

For example, the number of the information bits of the SCI carried in the second PSCCH is 80, and the MCS for the PSSCH corresponds to 16 quadrature amplitude modulation (QAM) and a coding rate of 0.5. If the modulation and coding scheme for the second PSCCH is the same as that for the PSSCH, the second PSCCH may occupy 40 resource elements (REs) determined via 80/(0.5*4). The terminal device may adjust the transmission resource occupied by the second PSCCH according to the first parameter. For example, in mode 1, in case that the network device allocates resources for the terminal device, the first parameter is carried in downlink control information (DCI). If a value of the first parameter is 2, the terminal device determines that the second PSCCH occupies 80 REs.

For another example, the number of the information bits of the second SCI carried in the second PSCCH is 80, and the MCS for the PSSCH corresponds to 16QAM and a coding rate of 0.5. If the coding rate for the second PSCCH is the same as that for the PSSCH, and the modulation scheme for the second PSCCH is the QPSK modulation, the second PSCCH may occupy 80 REs determined via 80/(0.5*2). The terminal device may adjust the transmission resource occupied by the second PSCCH according to the first parameter. For example, in mode 2, resource pool configuration information includes the first parameter. If the value of the first parameter is 1.5, the terminal device determines that the second PSCCH occupies 120 REs.

In the following, a method for determining a position of the second transmission resource is described.

In one example, the position of the second transmission resource may be determined via the transmission resource for the first PSCCH. In another example, the position of the second transmission resource may be determined via the transmission resource for the PSSCH.

For example, the network device configures that a time-domain start position of the second transmission resource is next to the last time-domain symbol occupied by the first PSCCH, a frequency-domain start position is the same as a frequency-domain start position of the PSSCH, and resource mapping is performed in an order of first frequency domain and then time domain. In this way, the position of the second transmission resource can be determined.

In some implementations, the first SCI further includes a first information field. The first information field is used to determine whether a frequency-domain resource of the second transmission resource is adjacent to a frequency-domain resource of the first transmission resource; and/or the first information field is used to determine whether a time-domain resource of the second transmission resource is adjacent to a time-domain resource of the first transmission resource.

For example, the first information field includes two bits. In case that the first information field is "00", it means that the frequency-domain resource of the second transmission resource is not adjacent to the frequency-domain resource of the first transmission resource, and the time-domain resource of the second transmission resource is not adjacent to the time-domain resource of the first transmission resource. In case that the first information field is "01", it means that the frequency-domain resource of the second transmission resource is not adjacent to the frequency-domain resource of the first transmission resource, and the time-domain resource of the second transmission resource is adjacent to the time-domain resource of the first transmission resource. In case that the first information field is "10", it means that the frequency-domain resource of the second transmission resource is adjacent to the frequency-domain resource of the first transmission resource, and the time-domain resource of the second transmission resource is not adjacent to the time-domain resource of the first transmission resource. In case that the first information field is "11", it means that the frequency-domain resource of the second transmission resource is adjacent to the frequency-domain resource of the first transmission resource, and the time-domain resource of the second transmission resource is adjacent to the time-domain resource of the first transmission resource.

In the implementations of the present disclosure, time-domain resource A and time-domain resource B being adjacent to each other includes the following three situations: time-domain resource A is located before time-domain resource B; time-domain resource A is located after time-domain resource B; time-domain resource A is located before and after time-domain resource B. In addition, the time-domain resource may be a time-domain symbol, such as an orthogonal frequency division multiplexing (OFDM) symbol, or other time-domain resources, which is not limited in this disclosure.

Figure 4:
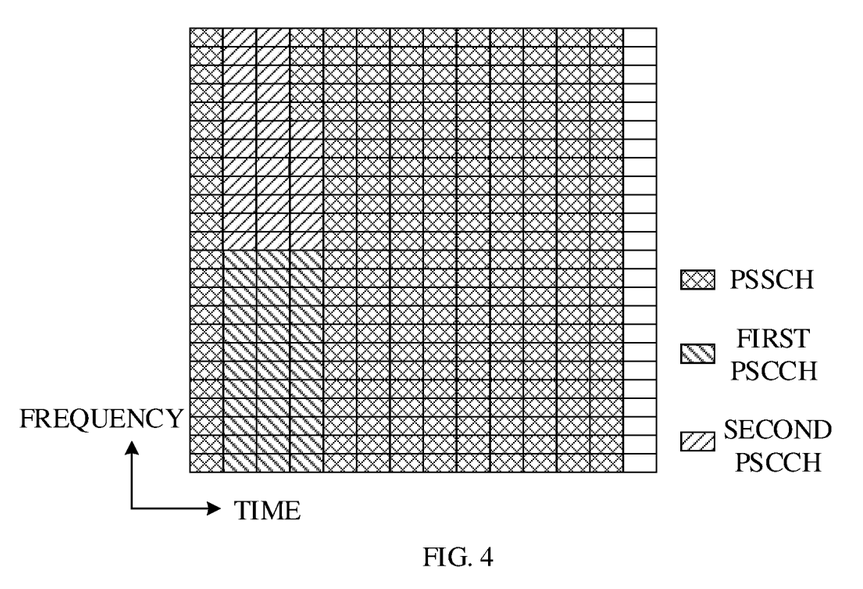
FIG. 4 is a schematic diagram illustrating a sidelink transmission resource according to implementations of the disclosure.

FIG. 4 is a schematic diagram illustrating a first transmission resource and a second transmission resource according to other implementations of the present disclosure. For brevity, FIG. 4 does not illustrate the PSSCH DMRS.

In FIG. 4, a rectangle with the smallest area represents an RE. FIG. 4 illustrates transmission resources corresponding to 14 time-domain symbols, that is, from left to right along a time axis, symbol 0 to symbol 13. Other similar graphics in the following have the same meaning.

Figure 5:
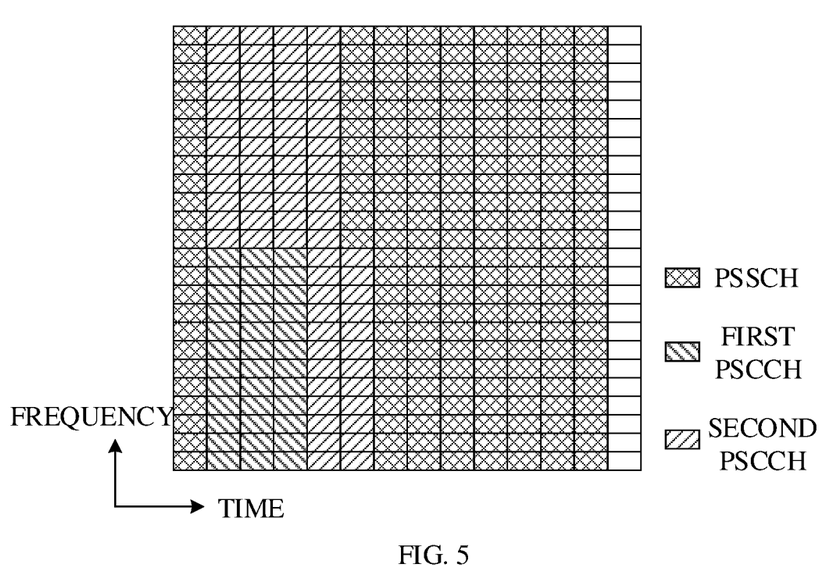
FIG. 5 is a schematic diagram illustrating a sidelink transmission resource according to other implementations of the disclosure.

The first PSCCH and the second PSCCH are both mapped on symbol 1 to symbol 3 and adjacent on the frequency domain. The second PSCCH starts from the first time-domain symbol occupied by the first PSCCH, and mapping of the second PSCCH starts from a frequency-domain resource adjacent to a frequency-domain resource for the first PSCCH. A mapping order is first frequency-domain mapping and then time-domain mapping. During the frequency-domain mapping, mapping is performed according to subcarriers from low to high. During the time-domain mapping, mapping is performed according to time-domain symbols from low to high. The second PSCCH cannot be mapped on the REs occupied by the PSSCH DMRS. If the time-domain symbols occupied by the first PSCCH are not enough for mapping of all the second PSCCH, the second PSCCH may be further mapped from a time-domain symbol adjacent to the time-domain symbols occupied by the first PSCCH, as illustrated in FIG. 5. For brevity, FIG. 5 does not illustrate the PSSCH DMRS.

Figure 6:
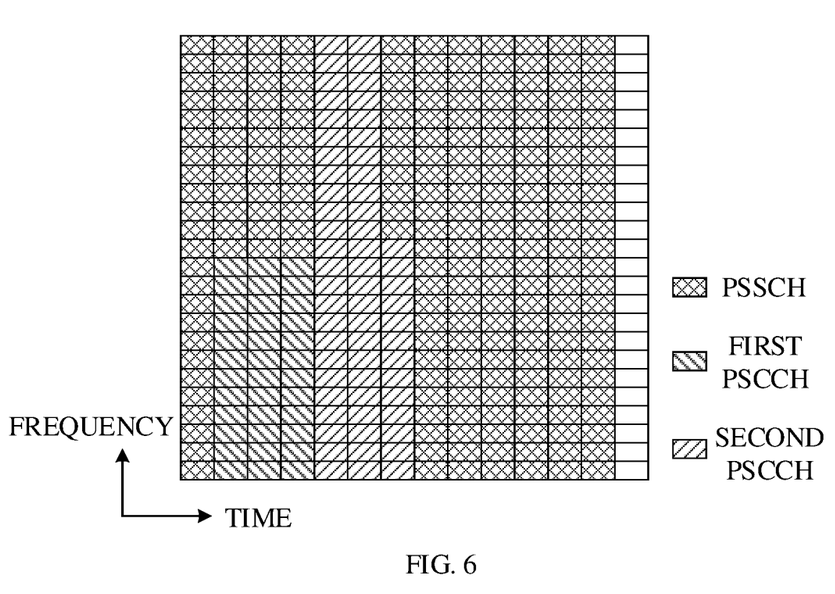
FIG. 6 is a schematic diagram illustrating a sidelink transmission resource according to other implementations of the disclosure.

FIG. 6 is a schematic diagram illustrating a first transmission resource and a second transmission resource according to other implementations of the present disclosure. For brevity, FIG. 6 does not illustrate the PSSCH DMRS.

Mapping of the second PSCCH starts from a time-domain symbol adjacent to the last time-domain symbol occupied by the first PSCCH. A mapping order is first frequency-domain mapping and then time-domain mapping. For some coding schemes, the terminal device may perform decoding after reception of the second PSCCH on part of symbols, without waiting for reception of the second PSCCH on all symbols. Therefore, the mapping order of first frequency domain and then time domain is beneficial to reduce decoding latency.

In FIG. 4, the first transmission resource and the second transmission resource are adjacent on the frequency domain. In FIG. 5, the first transmission resource and the second transmission resource are adjacent both on the frequency domain and the time domain. In FIG. 6, the first transmission resource and the second transmission resource are adjacent on time domain.

The terminal device (receiver) may determine the position and size of the second transmission resource according to the first information field, the second information field, and the first parameter in the first SCI. In one example, the first information field, the second information field, and the first parameter may also be carried in different SCIs.

Since fading may occur during signal transmission, the receiver may estimate channel performance based on the PSSCH DMRS. By mapping a channel on a time-domain resource adjacent to a time-domain position of the PSSCH DMRS, a performance estimation result of the channel is relatively accurate. Mapping the second PSCCH on the time-domain resource the same as and/or adjacent to the time-domain resource for the PSSCH DMRS can improve a performance estimation result of the second PSCCH.

In the following, several mapping manners of the second PSCCH according to the implementations of the present disclosure will be described with reference to several drawings.

Manner 1

On condition that a resource corresponding to time-domain symbols containing the PSSCH DMRS can carry all the second PSCCH, the time-domain resource of the second transmission resource is the same as the time-domain resource for the PSSCH DMRS. That is, in case that the second PSCCH can be all mapped on the time-domain resource for the PSSCH DMRS, the second PSCCH is preferentially mapped on the time-domain resource for the PSSCH DMRS.

Figure 7:
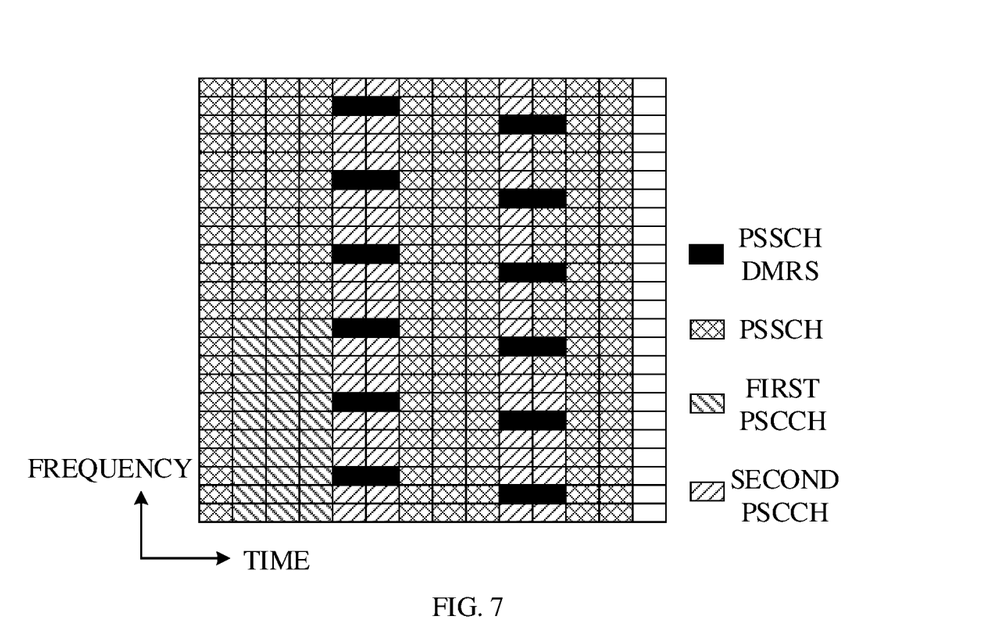
FIG. 7 is a schematic diagram illustrating a sidelink transmission resource according to other implementations of the disclosure.

As illustrated in FIG. 7, the first PSCCH is mapped on symbol 1 to symbol 3, and the time-domain resource occupied by the PSSCH DMRS includes symbol 4, symbol 5, symbol 9, and symbol 10. The second PSCCH can be all mapped on frequency-domain resources corresponding to the foregoing four symbols, and then all the second PSCCH is mapped on the foregoing four symbols. In one example, the second PSCCH is preferentially mapped on a symbol at the front position on the time domain, so that the receiver can detect the second PSCCH as soon as possible and reduce data transmission latency.

Figure 8:
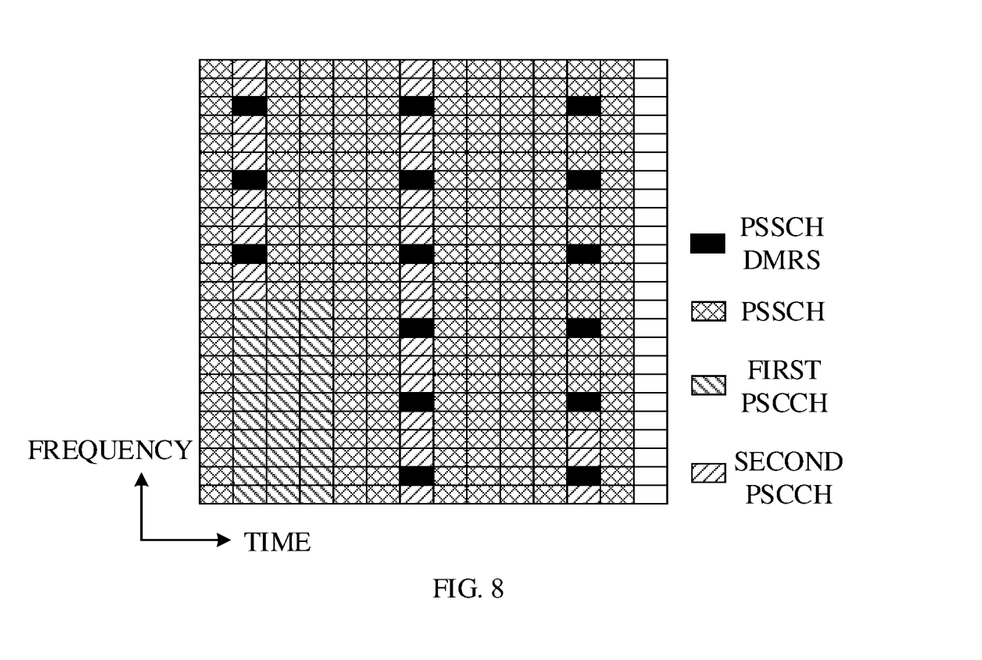
FIG. 8 is a schematic diagram illustrating a sidelink transmission resource according to other implementations of the disclosure.

As illustrated in FIG. 8, the first PSCCH is mapped on symbol 1 to symbol 3, and the time-domain resource occupied by the PSSCH DMRS includes symbol 1, symbol 6, and symbol 11. The second PSCCH can be all mapped on frequency-domain resources corresponding to the above three symbols (symbol 1, symbol 6, and symbol 11), and then all the second PSCCH are mapped on the above three symbols. In one example, the second PSCCH is preferentially mapped on a symbol at the front position on the time domain, so that the receiver can detect the second PSCCH as soon as possible and reduce data transmission latency. In this case, the first PSCCH is also mapped on symbol 1, and the transmission resource (that is, the second transmission resource) on which the second PSCCH is mapped and the transmission resource (that is, the first transmission resource) on which the first PSCCH is mapped do not overlap, so that interference caused by transmitting different signals on the same time-frequency resource can be avoided. The foregoing non-overlapping can be interpreted as that all REs included in the second transmission resource are completely different from all REs included in the first transmission resource.

Manner 2

On condition that a resource corresponding to the time-domain symbols containing the PSSCH DMRS can carry part of the second PSCCH, the second transmission resource includes a time-domain resource the same as the time-domain resource for the PSSCH DMRS and a time-domain resource adjacent to the time-domain resource for the PSSCH DMRS. For example, in case that only part of the second PSCCH can be mapped on the resource corresponding to the time-domain symbols containing the PSSCH DMRS, the part of the second PSCCH is preferentially mapped on the time-domain resource for the PSSCH DMRS, and the remaining part of the second PSCCH is mapped on a time-domain resource adjacent to the time-domain resource for the PSSCH DMRS. In this way, a relatively large part of the second PSCCH can be mapped on the time-domain resource for the PSSCH DMRS, thus improving accuracy of the performance estimation result of the second PSCCH.

Figure 9:
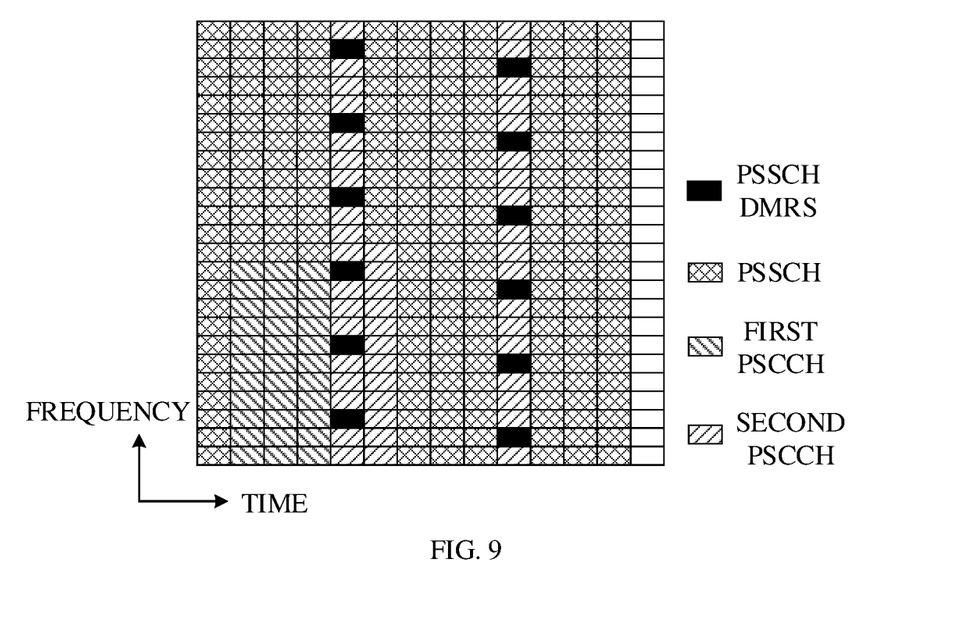
FIG. 9 is a schematic diagram illustrating a sidelink transmission resource according to other implementations of the disclosure.

As illustrated in FIG. 9, the first PSCCH is mapped on symbol 1 to symbol 3, and the time-domain resource occupied by the PSSCH DMRS includes symbol 4 and symbol 9. Only part of the second PSCCH can be mapped on frequency-domain resources corresponding to the above two symbols. After mapping the part of the second PSCCH on the above two symbols, the remaining part of the second PSCCH is mapped on a time-domain resource adjacent to symbol 4.

In some implementations, in order to map the remaining part of the second PSCCH on the time-domain resource adjacent to the time-domain resource for the PSSCH DMRS, the remaining part of the second PSCCH is mapped on a time-domain resource adjacent to the first time-domain symbol for the PSSCH DMRS. For example, as illustrated in FIG. 9, if the remaining part of the second PSCCH may be mapped on two time-domain symbols, the remaining part of the second PSCCH is preferentially mapped on a time-domain symbol adjacent to the first time-domain symbol (that is, symbol 4) for the PSSCH DMRS, for example, the remaining part of the second PSCCH is mapped on time-domain symbol 5 and time-domain symbol 6, or mapped on time-domain symbol 3 and time-domain symbol 5.

Manner 3

On condition that a resource corresponding to the time-domain symbols containing the PSSCH DMRS cannot carry the second PSCCH, the time-domain resource of the second transmission resource is adjacent to the time-domain resource for the PSSCH DMRS. For example, in case that the resource corresponding to the time-domain symbols containing the PSSCH DMRS may all be occupied by the PSSCH DMRS, the second PSCCH is mapped on a time-domain resource adjacent to the time-domain resource for the PSSCH DMRS.

Figure 10:
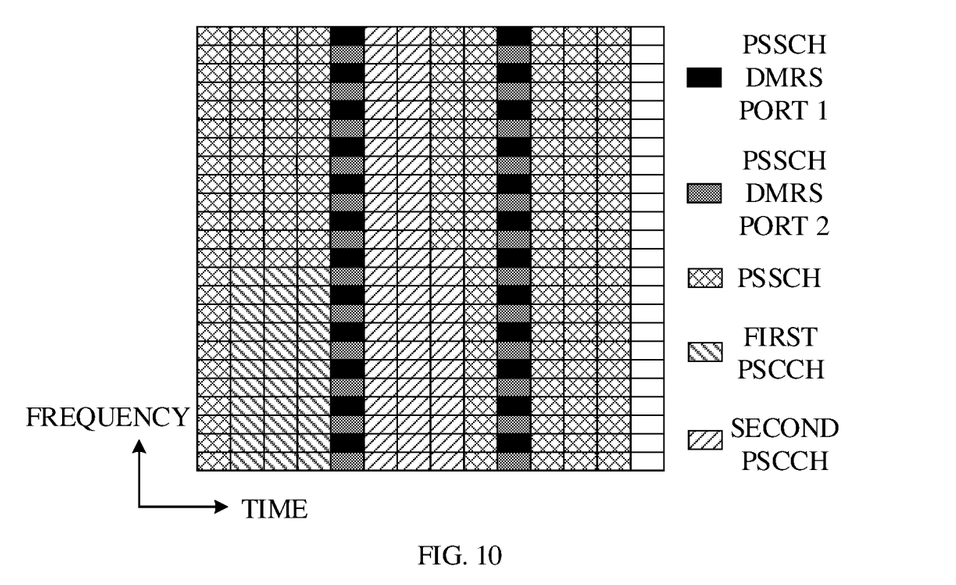
FIG. 10 is a schematic diagram illustrating a sidelink transmission resource according to other implementations of the disclosure.

As illustrated in FIG. 10, the first PSCCH is mapped on symbol 1 to symbol 3. The time-domain resource occupied by PSSCH DMRS includes symbol 4 and symbol 9. Each time symbol occupied by the PSSCH DMRS supports DMRSs corresponding to two antenna ports, and the DMRSs corresponding to the two antenna ports are processed in frequency division multiplexing. That is, on the same time-domain symbol occupied by the PSSCH DRMS, DMRSs corresponding to different antenna ports occupy different frequency-domain resources. The second PSCCH cannot be mapped on the time-domain symbols occupied by the PSSCH DMRS in FIG. 10, so that mapping of the second PSCCH may start from a symbol adjacent to the first time-domain symbol occupied by the PSSCH DMRS (that is, symbol 4). In one example, mapping of the second PSCCH starts from an adjacent time-domain symbol after the first time-domain symbol occupied by the PSSCH DMRS, for example, starting from symbol 5. During mapping of the second PSCCH, a mapping order is first frequency domain and then time domain, that is, on symbol 5 part of the second PSSCH is mapped according to subcarriers from low to high, then another part of the second PSSCH is mapped on symbol 6, and so on, until all the second PSCCH is mapped.

Figure 11:
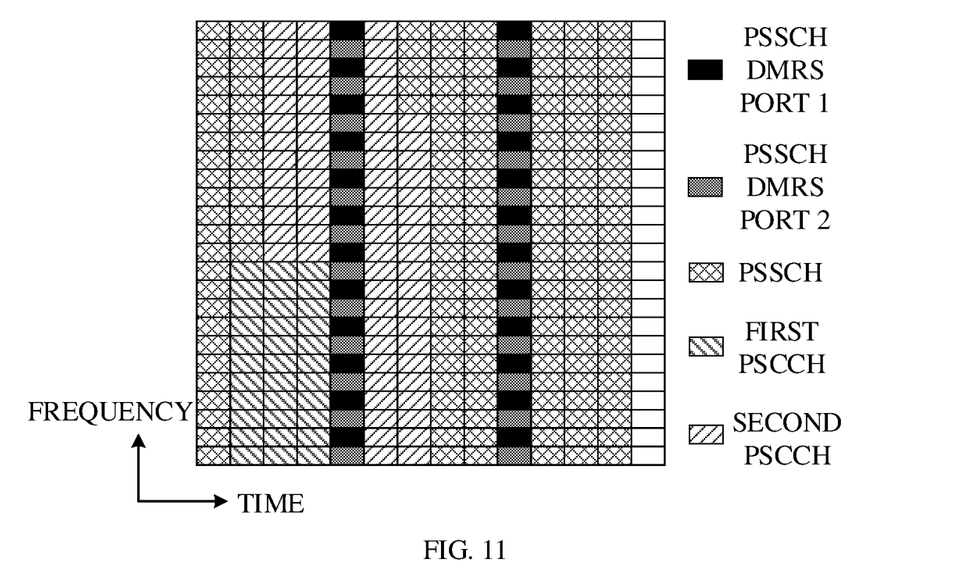
FIG. 11 is a schematic diagram illustrating a sidelink transmission resource according to other implementations of the disclosure.

As illustrated in FIG. 11, the first PSCCH is mapped on symbol 1 to symbol 3. The time-domain resource occupied by the PSSCH DMRS includes symbol 4 and symbol 9. Each time-domain symbol occupied by the PSSCH DMRS supports DMRSs corresponding to two antenna ports, and the DMRSs corresponding to the two antenna ports are processed in frequency division multiplexing. That is, on the same time-domain symbol occupied by the PSSCH DRMS, DMRSs corresponding to different antenna ports occupy different frequency-domain resources. The second PSCCH cannot be mapped on the time-domain symbols occupied by the PSSCH DMRS in FIG. 11, so that mapping of the second PSCCH may start from a symbol adjacent to the first time-domain symbol occupied by the PSSCH DMRS (that is, symbol 4). In one example, the second PSCCH is first mapped on a time-domain symbol adjacent to the first time-domain symbol occupied by the PSSCH DMRS, and then mapped on a next adjacent time-domain symbol, and so on. For example, if the first time-domain symbol occupied by the PSSCH DMRS is symbol 4, the second PSCCH is first mapped on frequency-domain resources corresponding to symbol 3 and symbol 5. If a part of the second PSCCH is not mapped on the frequency-domain resources corresponding to symbol 3 and symbol 5, then the part of the second PSCCH is mapped on symbol 2 and symbol 6, and so on, until all the second PSCCH is mapped.

In some implementations, in case that the second PSCCH can be mapped on multiple available time-domain resources for the PSSCH DMRS, the second PSCCH may be preferentially mapped on the first time-domain resource (that is, the first position on the time-domain) for the PSSCH DMRS. If the first time-domain resource for the PSSCH DMRS is not enough to carry the second PSCCH, the second PSCCH may be mapped on a time-domain resource adjacent to the first time-domain resource for the PSSCH DMRS. In this way, the receiver can detect the second PSCCH as soon as possible, so as to decode the PSSCH as soon as possible, thus reducing transmission latency.

Figure 12:
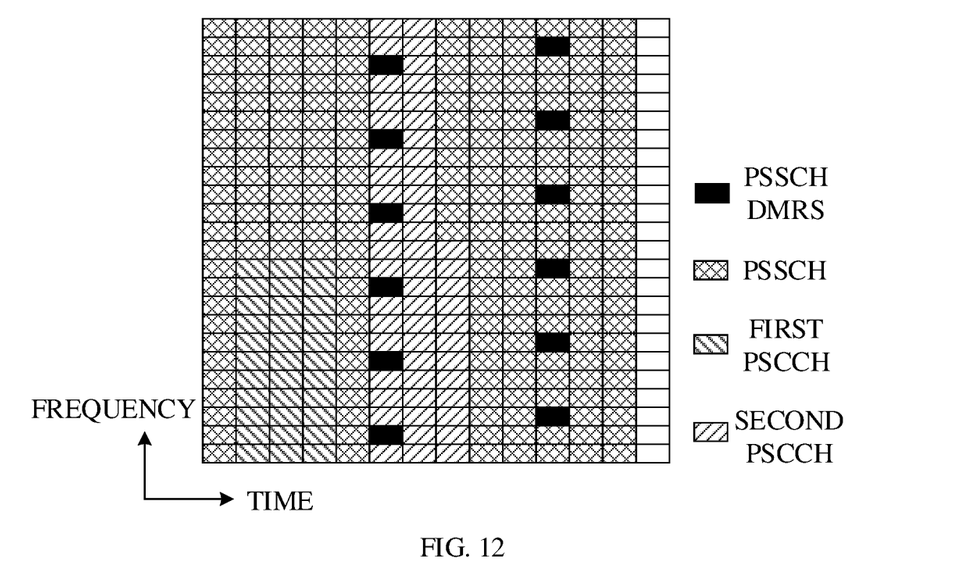
FIG. 12 is a schematic diagram illustrating a sidelink transmission resource according to other implementations of the disclosure.

As illustrated in FIG. 12, the first PSCCH is mapped on symbol 1 to symbol 3. The time-domain resource occupied by the PSSCH DMRS includes symbol 5 and symbol 10. In order to enable the receiver to detect the second PSCCH as soon as possible, the second PSCCH may be mapped on symbol 5 and symbols 6 and 7 adjacent to symbol 5, instead of being mapped on symbol 10.

Figure 13:
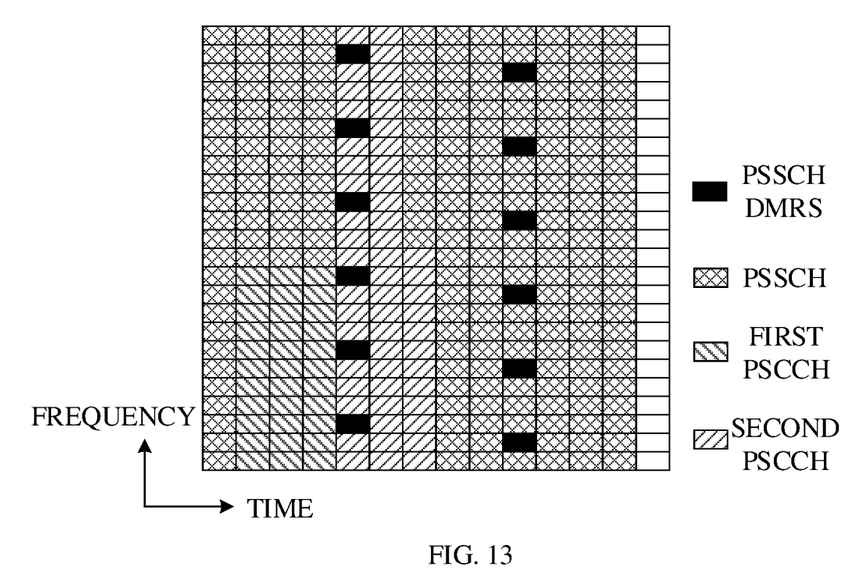
FIG. 13 is a schematic diagram illustrating a sidelink transmission resource according to other implementations of the disclosure.

As illustrated in FIG. 13, the first PSCCH is mapped on symbol 1 to symbol 3. The time-domain resource occupied by the PSSCH DMRS includes symbol 4 and symbol 9. In order to enable the receiver to detect the second PSCCH as soon as possible, the second PSCCH may be mapped on symbol 4 and symbols 5 and 6 adjacent to symbol 4, instead of being mapped on symbol 9.

In some implementations, the time-domain resource of the second transmission resource is located in a slot, and the time-domain resource of the second transmission resource does not include a first time-domain symbol and a last time-domain symbol in the slot.

In one slot, the first symbol is usually used for automatic gain control (AGC) and is usually not used for demodulation, and the last symbol is usually used as a guard period (GP) on which no data is mapped. Therefore, mapping the second PSCCH on symbols other than the first symbol and the last symbol can prevent miss detection of information.

The foregoing describes in detail an example of the method for determining the sidelink transmission resource according to the implementations of the disclosure. It can be understood that, in order to implement the above-mentioned functions, an apparatus for determining a sidelink transmission resource includes hardware structures and/or software modules used to perform the respective functions. Those skilled in the art can easily realize that, in combination with units and algorithm steps of examples described in the implementations disclosed herein, the implementations of the present disclosure can be implemented in the form of hardware or a combination of hardware and computer software. Whether a certain function is executed by hardware or computer-software driving hardware depends on a specific application and design constraint conditions of the technical solution. Professionals and technicians can use different methods for each specific application to implement the described functions, but such implementation cannot be considered beyond the scope of the disclosure.

In the implementations of the disclosure, the apparatus for determining the sidelink transmission resource can be divided into functional units according to the above method implementations. For example, each function may correspond to a functional unit, or two or more functions can be integrated in one processing unit. The integrated unit can be implemented in the form of hardware or a software functional unit. It can be noted that the division of units in the implementations of the disclosure is illustrative, and is only a logical function division, and there may be other division in practices.

Figure 14:
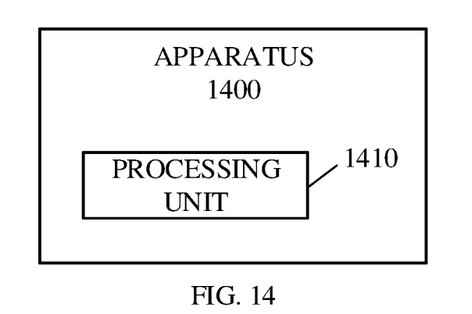
FIG. 14 is a schematic diagram illustrating an apparatus for determining a sidelink transmission resource according to implementations of the disclosure.

FIG. 14 is a schematic diagram illustrating an apparatus 1400 for determining a sidelink transmission resource according to implementations of the disclosure. The apparatus 1400 includes a processing unit 1410. The processing unit 1410 is configured to determine a third transmission resource for transmitting a PSSCH, and determine a second transmission resource in the third transmission resource. The second transmission resource includes a time-domain resource the same as and/or adjacent to a time-domain resource for a DMRS of the PSSCH. The second transmission resource is used for transmitting a second PSCCH. The third transmission resource further includes a first transmission resource for transmitting a first PSCCH.

In some implementations, on condition that the time-domain resource for the DMRS is able to carry all the second PSCCH, the time-domain resource of the second transmission resource is the same as the time-domain resource for the DMRS. Alternatively, on condition that the time-domain resource for the DMRS is able to carry part of the second PSCCH, the time-domain resource of the second transmission resource includes a time-domain resource the same as the time-domain resource for the DMRS and a time-domain resource adjacent to the time-domain resource for the DMRS. Alternatively, on condition that the time-domain resource for the DMRS is unable to carry the second PSCCH, the time-domain resource of the second transmission resource is adjacent to the time-domain resource for the DMRS.

In some implementations, the processing unit 1410 is further configured to map the second PSCCH preferentially on the time-domain resource for the DMRS, in response to the time-domain resource for the DMRS being able to carry all or part of the second PSCCH.

In some implementations, the processing unit 1410 is further configured to map the second PSCCH on the second transmission resource in an order of first frequency domain and then time domain.

In some implementations, the second transmission resource including the time-domain resource the same as and/or adjacent to the time-domain resource for the DMRS includes that the second transmission resource includes a time-domain resource the same as and/or adjacent to a first time-domain resource for the DMRS.

In some implementations, the first PSCCH carries first SCI including a first information field. The first information field is used for determining whether a frequency-domain resource of the second transmission resource is adjacent to a frequency-domain resource of the first transmission resource, and/or the first information field is used for determining whether a time-domain resource of the second transmission resource is adjacent to a time-domain resource of the first transmission resource.

In some implementations, the first PSCCH carries a first SCI including a second information field, where the second information field is used for determining a size of the second transmission resource.

In some implementations, the second information field includes at least one of: an aggregation level for the second PSCCH, a format of a second SCI carried in the second PSCCH, a size of a frequency-domain resource occupied by the second PSCCH, the number of time-domain symbols occupied by the second PSCCH, and index information of the second transmission resource in a resource set, where the resource set is preset or pre-configured.

In some implementations, the processing unit 1410 is further configured to obtain a first parameter. The processing unit 1410 is configured to determine the size of the second transmission resource according to the first parameter and the second information field.

In some implementations, the processing unit 1410 configured to obtain the first parameter is configured to: obtain the first parameter according to pre-configured information or preset information; receive configuration information from a network device through a receiving unit and obtain the first parameter according to the configuration information; obtain the first parameter according to resource pool configuration information; or receive the first PSCCH and obtain the first parameter according to the first PSCCH through the receiving unit.

In some implementations, the second transmission resource and the first transmission resource do not overlap.

In some implementations, the time-domain resource of the second transmission resource is located in a slot, and the time-domain resource of the second transmission resource does not include a first time-domain symbol and a last time-domain symbol in the slot.

In some implementations, the first SCI in the first PSCCH includes a third information field, where the third information field includes information for recourse sensing, and the second SCI in the second PSCCH includes information for demodulating the PSSCH.

In some implementations, the information for recourse sensing includes at least one of: information of the third transmission resource, priority information of traffic carried in the PSSCH, and indication information of reserved transmission resource.

In some implementations, the information for demodulating the PSSCH includes at least one of: MCS, the number of transmission layers, a process number of HARQ, a NDI, an ID of a terminal device transmitting the PSSCH, and a destination ID.

For the specific manner in which the apparatus 1400 executes the method for determining the sidelink transmission resource and the beneficial effects produced, reference may be made to the related description in the method implementations.

Figure 15:
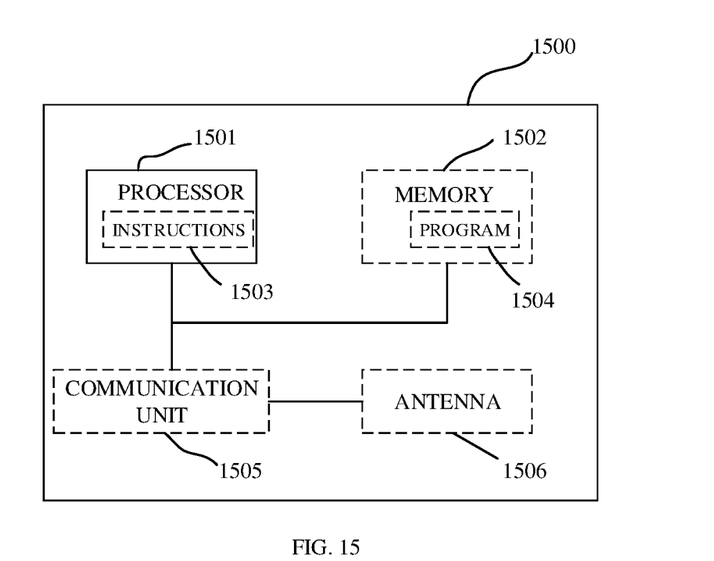
FIG. 15 is a schematic diagram illustrating a device for determining a sidelink transmission resource according to implementations of the disclosure.

FIG. 15 is a schematic structural diagram illustrating a terminal device 1500 according to implementations of the present disclosure. In FIG. 15, a unit or module indicated via dotted lines may be optional. The device 1500 may be used to implement the methods described in the foregoing method implementations. The device 1500 may be a terminal device or a chip.

The device 1500 includes one or more processors 1501. The one or more processors 1501 can enable the device 1500 to implement the methods in the method implementations corresponding to FIGS. 3 to 13. The processor 1501 may be a general-purpose processor or a special-purpose processor. For example, the processor 1501 may be a central processing unit (CPU). The CPU may be configured to control the device 1500 to execute a software program and process data of the software program. The device 1500 may further include a communication unit 1505 to implement signal input (reception) and output (transmission).

For example, the device 1500 may be a chip. The communication unit 1505 may be an input and/or output circuit of the chip. Alternatively, the communication unit 1505 may be a communication interface of the chip. The chip may be used as a component of the terminal device or the network device or other wireless communication devices.

For another example, the device 1500 may be a terminal device or a network device. The communication unit 1505 may be a transceiver of the terminal device or the network device. Alternatively, the communication unit 1505 may be a transceiving circuit of the terminal device or the network device.

The device 1500 may include one or more memories 1502 with a program 1504 stored therein. The program 1504 can be run by the processor 1501 to generate instructions 1503 which cause the processor 1501 to execute the method described in the foregoing method implementations. In one example, the memory 1502 may also store data. In one example, the processor 1501 may also read data stored in the memory 1502. The data may be stored at a same storage address as the program 1504, or the data may be stored at a different storage address from the program 1504.

The processor 1501 and the memory 1502 may be provided separately or integrated together, for example, integrated on a system on chip (SOC) of the terminal device.

The device 1500 may also include an antenna 1506. The communication unit 1505 is configured to implement the transceiver function of the device 1500 through the antenna 1506.

For the specific manner in which the processor 1501 executes the method for determining the sidelink transmission resource and the beneficial effects produced, reference may be made to the related description in the method implementations.

It can be understood that each operation in the foregoing method implementations may be completed by a logic circuit in the form of hardware or instructions in the form of software in the processor 1501. The processor 1501 may be a CPU, a digital signal processor (DSP), an application specific integrated circuit (ASIC), a field programmable gate array (FPGA), or other programmable logic devices, such as discrete gates, transistor logic devices, or discrete hardware components.

The implementations of the present disclosure also provide a computer program product which, when executed by the processor 1501, implements the method described in any method implementations in the present disclosure.

The computer program product may be stored in the memory 1502. For example, the computer program product may be the program 1504. The program 1504 is finally converted into an executable object file through processes such as preprocessing, compilation, assembly, and linking and the executable object file can be executed by the processor 1501.

The implementations of the present disclosure also provide a computer-readable storage medium storing a computer program. When the computer program is executed by a computer, the method described in any method implementation in the present disclosure is implemented. The computer program may be a high-level language program or an executable target program.

The computer-readable storage medium is, for example, the memory 1502. The memory 1502 may be a volatile memory or a non-volatile memory, or the memory 1502 may include both a volatile memory and a non-volatile memory. The non-volatile memory can be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), which is used as external cache. By way of exemplary but not restrictive description, many forms of RAM are available, such as a static random access memory (static RAM, SRAM), a dynamic random access memory (dynamic RAM, DRAM), a synchronous dynamic random access memory (synchronous DRAM, SDRAM), a double data rate SDRAM (DDR SDRAM), an enhanced synchronous dynamic random access memory (enhanced SDRAM, ESDRAM), a synchronous connection dynamic random access memory (synchlink DRAM, SLDRAM), and a direct rambus RAM (DR RAM).

Those skilled in the art can clearly understand that, for the convenience and conciseness of description, for specific work processes of the apparatus and device and technical effects produced, reference can be made to the corresponding process and technical effects in the foregoing method implementations, which will not be repeated herein.

In the several implementations provided in this disclosure, the disclosed system, apparatus, and method can be implemented in other ways. For example, some features in the method implementations described above may be ignored or not implemented. The apparatus implementations described above are merely illustrative. The division of units is only a logical function division. In actual implementation, there may be other division methods, and multiple units or components may be combined or integrated into another system. In addition, the coupling between various units or the coupling between various components may be direct coupling or indirect coupling, and the foregoing coupling includes electrical, mechanical, or other forms of connection.

It can be understood that, in the various implementations of the present disclosure, the sequence number of each process does not mean the order of execution. The execution order of each process can be determined by its function and internal logic, and cannot constitutes any limitation to the implementation process of the implementations of the present disclosure.

In addition, the terms "system" and "network" in this disclosure are often used interchangeably. The term "and/or" in this disclosure is only an association relationship that describes associated objects, indicating that there can be three relationships, for example, A and/or B, which can mean: A alone exists, A and B both exist, and B alone exists. In addition, the character "/" in this disclosure generally indicates that the associated objects before and after the character "/" are in an "or" relationship.

In short, the above descriptions are only some implementations of the technical solutions of the present disclosure, and are not used to limit the protection scope of the present disclosure. Any modification, equivalent replacement, improvement, and the like made within the spirit and principle of this disclosure shall be included in the protection scope of this disclosure.

What is claimed is:

1. A method for determining a sidelink transmission resource, comprising:
   determining a third transmission resource, the third transmission resource comprising a transmission resource for transmitting a physical sidelink shared channel (PSSCH);
   determining a second transmission resource in the third transmission resource, the second transmission resource comprising a time-domain resource the same as and/or adjacent to a time-domain resource for a demodulation reference signal (DMRS) of the PSSCH, the second transmission resource being used for transmitting second sidelink control information (SCI), and the third transmission resource further comprising a first transmission resource for transmitting first SCI; and
   mapping the second SCI onto the second transmission resource in an order of first frequency domain and then time domain;
   wherein the first SCI comprises a first information field, wherein in a case where the first information field is a first value, the first information field indicates that a frequency-domain resource of the second transmission resource is adjacent to a frequency-domain resource of the first transmission resource, and in a case where the first information field is a second value, the first information field indicates that the frequency-domain resource of the second transmission resource is not adjacent to the frequency-domain resource of the first transmission resource, wherein the second value is different from the first value; and in a case where the first information field is a third value, the first information field indicates that a time-domain resource of the second transmission resource is adjacent to a time-domain resource of the first transmission resource, wherein the third value is different from the first value and the second value, and in a case where the first information field is a fourth value, the first information field indicates that the time-domain resource of the second transmission resource is not adjacent to the time-domain resource of the first transmission resource, wherein the fourth value is different from the first value, the second value and the third value.

2. The method of claim 1, wherein the second transmission resource comprising the time-domain resource the same as and/or adjacent to the time-domain resource for the DMRS comprises that the second transmission resource comprises a time-domain resource the same as and/or adjacent to a first time-domain resource for the DMRS.

3. The method of claim 1, wherein the first SCI comprises a second information field, wherein the second information field is used for determining a size of the second transmission resource.

4. The method of claim 3, wherein the second information field comprises at least one of:
a format of the second SCI; or
a coding rate for the second SCI.

5. The method of claim 3, further comprising:
obtaining a first parameter,
wherein determining the second transmission resource in the third transmission resource comprises:
determining the size of the second transmission resource according to the first parameter and the second information field.

6. The method of claim 5, wherein obtaining the first parameter comprises at least one of:
obtaining the first parameter according to pre-configured information or preset information;
receiving configuration information from a network device and obtaining the first parameter according to the configuration information; or
receiving the first SCI and obtaining the first parameter according to the first SCI.

7. The method of claim 1, wherein quadrature phase shift keying (QPSK) modulation is used for the second SCI, and/or the first SCI indicates a coding rate for the second SCI.

8. The method of claim 1, wherein a coding rate for the second SCI is the same as a coding rate for the PSSCH.

9. The method of claim 1, wherein the second transmission resource and the first transmission resource do not overlap.

10. The method of claim 1, wherein
the first SCI comprises a third information field, wherein the third information field comprises information for sensing; and the second SCI comprises information for demodulating the PSSCH.

11. The method of claim 10, wherein the information for sensing comprises at least one of:
information of the third transmission resource, priority information of traffic carried in the PSSCH, or indication information of reserved transmission resource.

12. The method of claim 10, wherein the information for demodulating the PSSCH comprises at least one of:
a process number of hybrid automatic repeat request (HARQ), a new data indication (NDI), an identifier (ID) of a terminal device transmitting the PSSCH, or a destination ID.

13. A terminal device, comprising
a processor; and
a memory storing a computer program which, when executed by the processor, causes the processor to:
determine a third transmission resource, the third transmission resource comprising a transmission resource for transmitting a physical sidelink shared channel (PSSCH);
determine a second transmission resource in the third transmission resource, the second transmission resource comprising a time-domain resource the same as and/or adjacent to a time-domain resource for a demodulation reference signal (DMRS) of the PSSCH, the second transmission resource being used for transmitting second sidelink control information (SCI), and the third transmission resource further comprising a first transmission resource for transmitting first SCI; and
map the second SCI onto the second transmission resource in an order of first frequency domain and then time domain;
wherein the first SCI comprises a first information field, wherein
in a case where the first information field is a first value, the first information field indicates that a frequency-domain resource of the second transmission resource is adjacent to a frequency-domain resource of the first transmission resource, and in a case where the first information field is a second value, the first information field indicates that the frequency-domain resource of the second transmission resource is not adjacent to the frequency-domain resource of the first transmission resource, wherein the second value is different from the first value; and in a case where the first information field is a third value, the first information field indicates that a time-domain resource of the second transmission resource is adjacent to a time-domain resource of the first transmission resource, wherein the third value is different from the first value and the second value, and in a case where the first information field is a fourth value, the first information field indicates that the time-domain resource of the second transmission resource is not adjacent to the time-domain resource of the first transmission resource, wherein the fourth value is different from the first value, the second value and the third value.

14. The terminal device of claim 13, wherein the second transmission resource comprising the time-domain resource the same as and/or adjacent to the time-domain resource for the DMRS comprises that the second transmission resource comprises a time-domain resource the same as and/or adjacent to a first time-domain resource for the DMRS.

15. The terminal device of claim 13, wherein the first SCI comprises a second information field, wherein the second information field is used for determining a size of the second transmission resource.

16. A network device, comprising
a processor; and
a memory storing a computer program which, when executed by the processor, causes the processor to:
determine a third transmission resource, the third transmission resource comprising a transmission resource for transmitting a physical sidelink shared channel (PSSCH);
determine a second transmission resource in the third transmission resource, the second transmission resource comprising a time-domain resource the same as and/or adjacent to a time-domain resource for a demodulation reference signal (DMRS) of the PSSCH, the second transmission resource being used for transmitting second sidelink control information (SCI), and the third transmission resource further comprising a first transmission resource for transmitting first SCI; and
map the second SCI onto the second transmission resource in an order of first frequency domain and then time domain;
wherein the first SCI comprises a first information field, wherein in a case where the first information field is a first value, the first information field indicates that a frequency-domain resource of the second transmission resource is adjacent to a frequency-domain resource of the first transmission resource, and in a case where the first information field is a second value, the first information field indicates that the frequency-domain resource of the second transmission resource is not adjacent to the frequency-domain resource of the first transmission resource, wherein the second value is different from the first value; and in a case where the first information field is a third value, the first information field indicates that a time-domain resource of the second transmission resource is adjacent to a time-domain resource of the first transmission resource, wherein the third value is different from the first value and the second value, and in a case where the first information field is a fourth value, the first information field indicates that the time-domain resource of the second transmission resource is not adjacent to the time-domain resource of the first transmission resource, wherein the fourth value is different from the first value, the second value and the third value.

* * * * *